G. F. BRIGGS.
COMBINED GUARD CAGE AND ROBBER TRAP.
APPLICATION FILED OCT. 6, 1921.
1,430,788.
Patented Oct. 3, 1922.
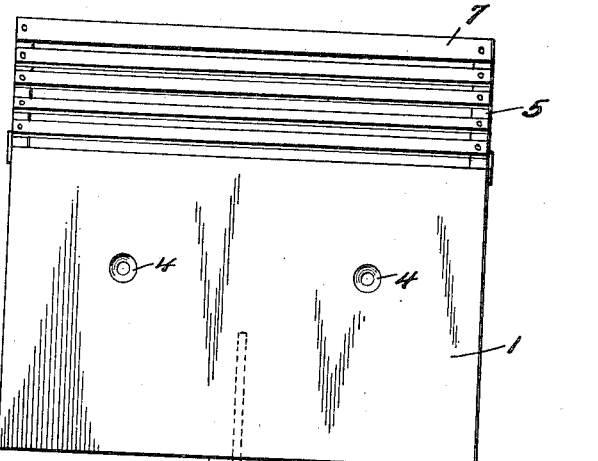
FIG. 1.
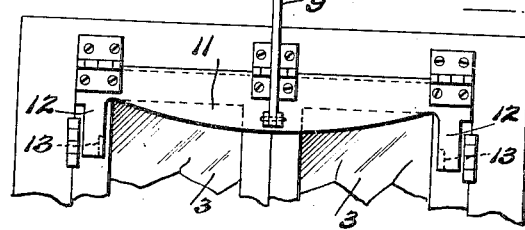
FIG. 2.
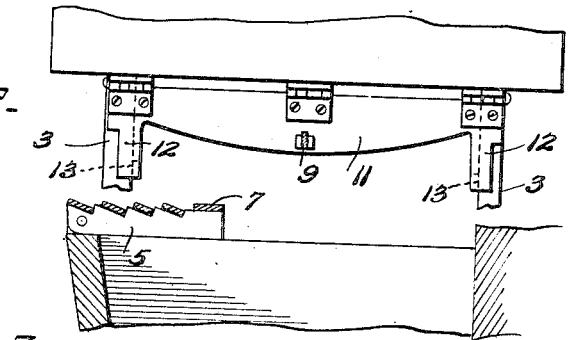
FIG. 3.
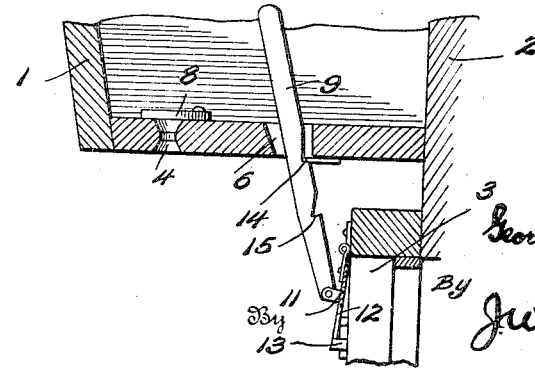
Inventor
George F. Briggs.
By J. W. Milburn
Attorney Patented Oct. 3, 1922.

1,430,788

UNITED STATES PATENT OFFICE.

GEORGE F. BRIGGS, OF BEAUMONT, TEXAS.

COMBINED GUARD CAGE AND ROBBER TRAP.

Application filed October 6, 1921. Serial No. 505,739.

*To all whom it may concern:*

Be it known that I, GEORGE F. BRIGGS, a citizen of the United States, residing at Beaumont, in the county of Jefferson and State of Texas, have invented a new and useful Improvement in a Combined Guard Cage and Robber Trap, of which the following is a specification.

My invention relates to guard cages for use in banks and similar buildings as a protection against robbery, and resides more particularly in the combination of such a guard cage with a device designed to trap a robber or burglar within a room or building and prevent his escape therefrom.

The principal objects of my invention are to afford a secure bullet-proof shelter or cage for a guard, to so position and construct the cage as will enable the guard to obtain a view of the entire room in which the cage is located, and to shoot from the cage without exposing himself to harm, and to further enable the guard to control from within the cage the closing and locking of the doors of the room to prevent the escape of the robbers or burglars.

These ends I attain by the structure and combination of parts illustrated in the accompanying drawing, wherein:

Fig. 1 is a front elevational view of my invention associated with double doors, the door locking means being shown in locking position;

Fig. 2 is a view taken on line x—x of Fig. 1, showing the relation of the door-locking means to the doors when the latter are open; and, Fig. 3 is a central vertical sectional view through Fig. 1, partly broken away.

The armored cage 1, which forms a part of my invention, may be rectangular, cylindrical, hexagonal or of any other suitable shape. In point of size, the cage is capable of considerable range, it being only important that it be sufficiently large to accommodate a man and preferably to permit him to stand erect within the cage.

The cage is supported in position by being attached to a wall 2, or in any other suitable manner, in a room of the building designed to be protected. The location of the cage is such as to permit the door-locking means to co-act effectively with the doors intended to be controlled.

As an example of this construction, I have shown the guard cage positioned close to and directly above a pair of doors 3. From his elevated position, the guard in the cage 1 is able to obtain a clear view of the entire room through port holes 4 in the walls of the cage, and to cover with a rifle or other firearm any robbers or burglars within the room. The port holes shown in the drawing are illustrative merely, since a larger or smaller number may be provided at various points in the walls of the cage, and their size and shape may, of course, be varied to suit the convenience or necessities of any particular situation. Sliding or pivoted covers 8 may be provided for the port holes.

To further increase the protection of the guard and minimize the danger of his detection and possible injury by persons within the room, I provide a shutter 5, having one or more narrow openings therein and capable of being raised or lowered at will. This shutter is preferably formed of strips or slats 7, slightly spaced apart, to furnish restricted sight openings between the slats. The shutter may also be armored. It may be mounted upon the cage in any convenient manner, as by being hinged to the cage at or near its upper edge, and any suitable means may be provided for operating the shutter from within the cage. By spacing the slats sufficiently far apart and giving them the proper angular position, either fixed or adjustable, it will be possible for the occupant of the cage to project a rifle directly through between adjacent slats and thus fire in any desired direction into the room under protection of the shutter.

The door locking mechanism forming part of my invention consists of a rigid rod 9, projecting through an aperture 6 in the bottom wall of the cage and having pivotally secured to its lower end a cross bar 11, hingedly attached to the wall immediately above the doors 3. As indicated in Fig. 2, when the bar is removed from before the doors, and the doors are standing open, they may be retained in open position by means of depending lugs 13, on the ends of arms 12 carried by the cross bar 11 at or near each end, the lugs projecting downwardly a sufficient distance to slightly overlap the top edge of the doors. In order to release the doors and permit them to swing back to closed position, the rod 9 is elevated a short distance to raise the lugs 13 clear of the doors. The doors may then be barred or locked by pressing down upon the rod 9, to force the bar 11 into its locking position across the closed doors, as shown in Fig. 3. The depression of rod 9 may be effected manually or by foot power, the latter perhaps being more convenient. The rod 9 may be held in depressed position by causing one of the notches 15 to engage the latch plate 14 at the edge of the aperture 6, sufficient lateral play of the rod in the aperture being provided for this purpose.

What I claim is:

1. In a device of the character described, a guard cage provided with port holes in its walls and an aperture in its bottom, a rod slidably positioned in said aperture and projecting into the interior of said cage, and a bar connected to the lower end of the rod and adapted to be moved into position before a door by the depression of said slidable rod.

2. In a device of the character described, an armored casing or cage of a size and shape to accommodate a guard, said cage being disposed above a door to be controlled and having an aperture in its wall, a rod slidably positioned in said aperture and projecting into the interior of said cage, and a bar connected to the lower end of the rod and adapted to be moved into position before the door by depression of said slidable rod, to prevent the opening of said door.

3. In a device of the character described, an armored casing or cage, of a size and shape to accommodate a guard, said cage being disposed above a door to be controlled and having an aperture in its wall, a rod slidably positioned in said aperture and projecting into the interior of said cage, a bar on the lower end of the rod adapted to be moved into position before the door by depression of said slidable rod to prevent the opening of said door, means for holding said rod in depressed position, and a member attached to said bar and adapted to engage said door to hold the latter in open position when the slidable rod is partially elevated.

In testimony whereof I affix my signature.

GEORGE F. BRIGGS.